United States Patent

[11] 3,586,130

| [72] | Inventors | Leo A. McCafferty, Jr.; Daniel H. Sides, both of Baltimore, Md. |
|---|---|---|
| [21] | Appl. No. | 862,680 |
| [22] | Filed | Oct. 1, 1969 |
| [45] | Patented | June 22, 1971 |
| [73] | Assignee | The Black and Decker Manufacturing Company, Towson, Md. |

[54] LUBRICATION SYSTEM FOR RECIPROCATING TOOL
8 Claims, 4 Drawing Figs.

[52] U.S. Cl. .................. 184/98, 184/69
[51] Int. Cl. .................. F16n 39/00
[50] Field of Search .................. 184/98, 99, 69; 123/196; 74/467, 468

[56] References Cited
UNITED STATES PATENTS

| 612,075 | 10/1898 | Webendorfer | 184/98 X |
| 1,074,291 | 9/1913 | Rank | 184/98 X |
| 1,139,697 | 5/1915 | Mertsheimer | 184/98 |
| 1,390,588 | 9/1921 | Rosner | 184/69 X |
| 2,702,215 | 2/1955 | Diefenderfer | 184/64 X |
| 3,204,619 | 9/1965 | Rubinowitz et al. | 123/196 X |
| 3,424,273 | 1/1969 | Carlson et al. | 184/98 |

Primary Examiner—Manuel A. Antonakas
Attorneys—Leonard Bloom and Joseph R. Slotnik CLAIM: A portable power tool including a rigid housing and handle. A tool bit supported by the housing is adapted to be rotated and reciprocated by a motor within the housing. A novel lubrication system is provided to lubricate transmission parts within the housing which impart reciprocation to the tool bit from the motor. Lubrication is effected by a lowered viscosity of a lubricating oil, as the result of normal operating temperatures within the tool housing, and normal vibrations of the tool.

PATENTED JUN 22 1971  3,586,130

INVENTORS
LEO A. McCAFFERTY JR.
DANIEL H. SIDES
BY Joseph R. Slotnik
ATTORNEY 3,586,130

LUBRICATION SYSTEM FOR RECIPROCATING TOOL

SUMMARY OF THE INVENTION

The present invention is directed to a novel lubrication system for certain internal moving parts of a power tool on the like device, which system relies upon inherent physical properties of the lubricant and the physical conditions within the device and during operation thereof to carry out lubrication. Thus, lubricating oil saturates a porous, wicklike member disposed adjacent to but spaced from the parts to be lubricated. During operation of the device, internal heat developed therein lowers the viscosity of the oil to a point where normal working vibration in the tool causes oil to drop from the porous, wicklike member onto the transmission parts. The lack of contact between the wicklike member and moving parts within the tool prevents excessive dispersion of oil within the tool and materially reduces oil consumption.

Main objects of the present invention, therefore, are to provide a novel internal lubrication system for a power tool on the like which disperses lubricant at a rate directly related to actual need and thereby minimizes lubricant consumption and loss.

Further important objects of the invention are to provide a novel lubrication system of the above character which reduces the likelihood of tool failure as a result of loss of lubricant and which materially increases the useful tool life before lubricant replenishment is required without adding to size, weight, or cost.

Additional important objects are to provide a novel lubrication system of the above character which is relatively inexpensive to manufacture, rugged in construction, and reliable in use.

Other objects and advantages of the invention will become more apparent from a consideration of the detailed description to follow taken in conjunction with the drawings annexed hereto.

BROAD STATEMENT OF THE INVENTION

Broadly described, the present invention relates to a powered device having a housing, a mechanical drive train within said housing and including relatively moving component parts, lubricating means for said component parts comprising a porous member impregnated with a variable viscosity lubricating oil and positioned within said housing adjacent said component parts, said porous member and said component parts being separated by an air gap, said oil resisting free flow from said porous member at ambient temperatures, said oil having its viscosity lowered by heat generated internally of said housing by said drive train during operation of said device whereby said lower viscosity and said normal working vibrations during operation of said device cause said oil to drip freely from said porous member onto said component parts.

In another aspect, the present invention relates to a powered tool or the like of the type including a housing having a motor, a transmission including a crankshaft driven by said motor and including a crank; the improvement in said tool which includes lubricating means for said transmission including an oil reservoir in said housing and adapted to have lubricating oil disposed therein, a porous member in said reservoir and impregnated with said porous member being spaced from said crank by an air gap, said oil resisting free flow from said porous member at ambient temperatures, whereby heat developed within said housing during operation of said transmission reduces the viscosity of said oil to a level where vibration of said housing during operation of said tool causes said oil to drip from said porous member onto said crank.

DETAILED DESCRIPTION

Figure 1:
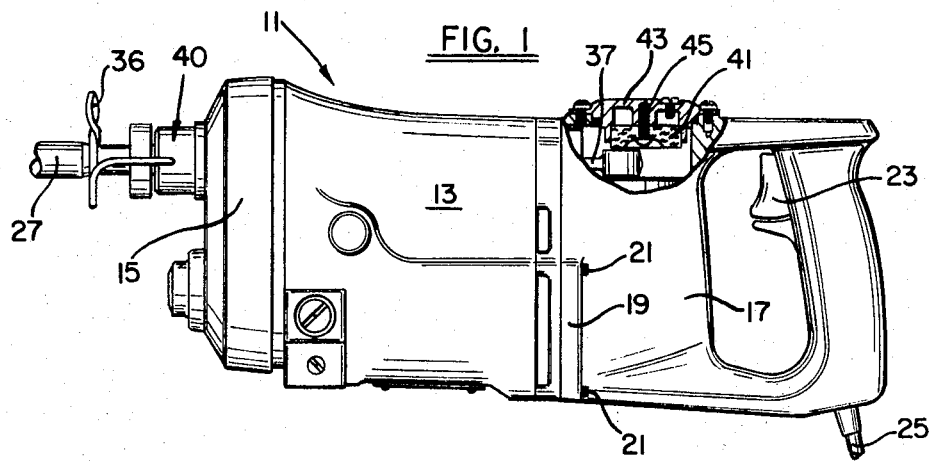
FIG. 1 is a side elevational view, partly broken away and in section, illustrating a portable power tool embodying the present invention.

Referring now more specifically to the drawings, a portable rotary hammer which is one-type device with which the present invention finds use, is illustrated generally at 11 in FIG. 1 and is seen to include a case housing 13 having an end housing 15 suitably secured thereto. An end handle and gear case 17 is rigid with the case housing 13 and is formed with lateral flanges 19 fixed to the case housing 13 by screws 21. The handle and gear case 17 has a control trigger switch 23, and a conventional line cord 25 depends therefrom for connection to a suitable power source.

The rotary hammer 11 is provided with an electric motor (not shown) which is disposed within the lower portion of the case housing 13 and which is adapted to impart longitudinal reciprocating as well as rotating movement to a tool bit 27. To reciprocate the tool bit 27 the electric motor drives a crankshaft 29 supported within the gear case by bearings 31 (only one of which is shown). A crank 33 on an enlarged end 32 of the crankshaft 29 is connected to a bearing end 34 of a connecting rod 37, the other end of which is pivotally connected to a piston 35. The piston 35 reciprocates within a cylinder sleeve 38 as the crank 33 turns, and it imparts similar reciprocation to a floating ram (not shown) which is adapted to hammer on the inner end of the tool bit 27. A bit retainer 36 on a nose piece 40 which extends from the end housing 15 prevents the tool bit 27 from pulling out of the end housing 15.

In addition, the electric motor (not shown) is adapted to rotate the tool bit 27 about its longitudinal axis. To this end, the motor (not shown) may be connected through a transmission to a socketed gear which slidably and nonrotatably receives a complimentary end of the tool bit 27. This construction, however, forms no part of the present invention and is not illustrated nor described further here. For a better understanding thereof, reference may be made to U.S. Pat. No. 3,203,490, granted Aug. 31, 1965, to G. W. McCarty et al., and owned by the assignee of the present application.

It will be appreciated that the crankshaft 29, crank 33, connecting rod 37, the piston 35, and its associated parts, all require lubrication during use of the tool 11 to insure adequate part life. In the past, many devices of this type have employed a porous, wicklike member saturated with lubricating oil and having one surface in wiping engagement with, for example, the crank end 34 of the connecting rod. Although the lubrication achieved by this system is effective, it generally results in a large amount of oil being thrown about within the housing and out the housing front end. This is so because the heat developed within the housing during operation of the device acts to reduce the viscosity of the oil and makes it flow more easily. Then, as the wicklike member is "Wiped," a large amount of oil is drawn out and thrown about by the moving transmission parts. The end result of this is that a relatively large amount of oil is lost and has to be replaced frequently or the transmission parts could be damaged.

In the present invention, this problem is overcome by taking advantage of the physical conditions existent within the housing and the inherent properties of lubricating oil to effect a more realistic dispersal of the oil during operation of the device. Manifestly, lubricating oil is dispersed to the moving parts in the present invention at a rate which is directly related to the amount actually needed.

Figure 2:
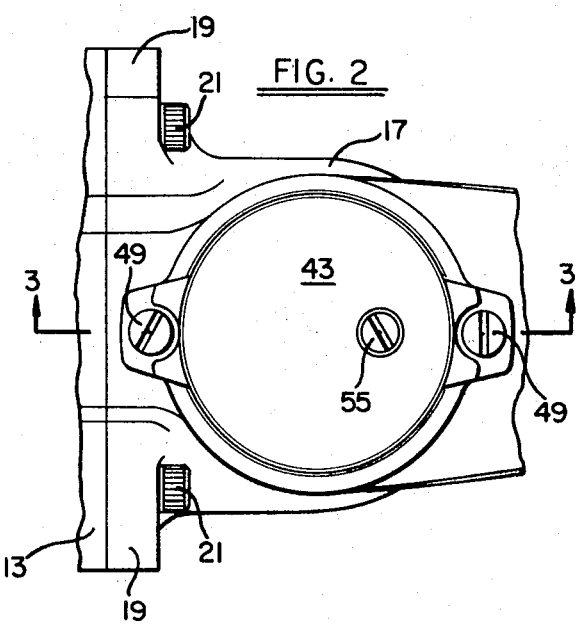
FIG. 2 is an enlarged top plan view of a portion of FIG. 1.
Figure 4:
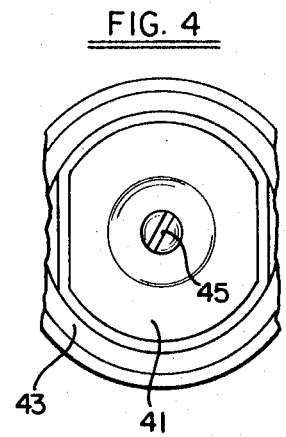
FIG. 4 is a partial view of FIG. 3 taken along the line 4—4 thereof.
Figure 3:
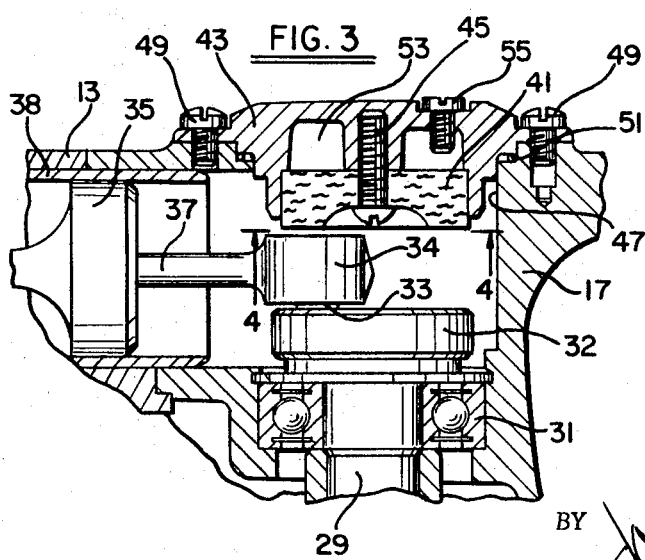
FIG. 3 is a sectional view of FIG. 2 taken along the line 3—3 thereof.

Turning now to FIGS. 2—4, a porous, wicklike member 41, here, a felt pad positioned within the handle and gear case 17, is shown secured to a removable cover cap 43 by a screw 45. The cap 43 is secured in place about an opening 47 in the gear case 17 by screws 49 and an O-ring 51 provides a seal between the cap 43 and the gear case 17 to prevent loss of oil therepast.

The porous member 41 is adapted to be saturated with lubricating oil. To this end, the member 41 may be communicated with an oil reservoir 53 in the gear case 17 or, in the case, the cover cap 43. A removable plug 55 in the cover cap 43 allows the reservoir 53 to be filled with oil without removing the porous member 41. Alternatively, the porous member 41 itself could be the oil reservoir and oil delivered directly thereto, for example, by means of a removable plug.

Of utmost importance is the fact that the oil-saturated member 41 is disposed adjacent to but spaced from the component parts of the transmission to be lubricated. Thus, as shown in FIG. 3, the member 41 is spaced from the crank end 34 of the connecting rod 34 so that no wiping contact occurs therebetween. When the tool 11 is not operating and the parts are cool (at ambient temperatures), the viscosity of the lubricating oil prevents it from coming out of the porous member 41. However, during tool operation, heat generated by the parts within the gear case 17 raises the temperature of the oil within the porous member 41 and lowers its viscosity. The oil then is able to flow more freely so that normal vibration of the parts which is induced by impacting against the tool bit 27 during operation of the tool causes the oil to drip out of the porous member 41 onto the transmission parts. Specifically, the oil drips onto the crank 33 and the crank end 34 of the connecting rod 37 and, as the crank 33 turns the crank end 34 orbits, and the piston 35 reciprocates, somewhat of an oil mist is formed which lubricates these parts, the piston 35, and the other parts within the gear case 17 and the case housing 13. It will be appreciated that the rate of oil dispersal from the porous member 41 is directly related to the heat generated within the housing during tool operation and that this rate of dispersal is directly related to what quantity of oil is actually needed.

By way of example, a portable electric rotary hammer of the type illustrated and described herein can use a lubricating oil having a viscosity of from about 50,000 to about 2,000,000 Saybolt Seconds at 0° F. and from about 80 Saybolt Seconds at 212° F. A typical lubricating oil presently used has a viscosity of 2,000,000 Saybolt Seconds at 0° F. and 80 Saybolt Seconds at 212° F. Using the same quantities of this oil under similar conditions, a lubrication system using direct wiping action lasted for about 9 hours of continuous operation before the oil reservoir ran dry. With the lubrication system of the present invention, this time was extended to 40 hours.

While a preferred embodiment of this invention has been illustrated and described above in detail, various additions, substitutions, modifications and omissions may be made thereto without departing from the spirit of the invention.

We claim:

1. A powered device having a housing, a mechanical drive train within said housing and including relatively moving component parts, lubricating means for said component parts comprising a porous member impregnated with a variable viscosity lubricating oil and positioned within said housing adjacent said component parts, said porous member and said component parts being separated by an air gap, said oil resisting free flow from said porous member at ambient temperatures, said oil having its viscosity lowered by heat generated internally of said housing by said drive train during operation of said device, whereby said lower viscosity and said normal working vibrations during operation of said device causes said oil to drip freely from said porous member onto said component parts.

2. A device as defined in claim 1 wherein said porous member includes a felt pad.

3. A device as defined in claim 1 wherein said housing includes an oil reservoir, said porous member being disposed within and covering said reservoir.

4. A device as defined in claim 1 wherein said housing has a removable cover, said porous member being detachably secured to said cover.

5. A device as defined in claim 3 which includes a removable plug in said housing allowing said reservoir to be filled with said oil.

6. A device as defined in claim 1 wherein said drive train includes a rotatable crank adjacent said porous member and spaced therefrom by said air gap.

7. A powered tool or the like of the type including a housing having a motor, a transmission including a crankshaft driven by said motor and including a crank; the improvement in said tool which includes lubricating means for said transmission including an oil reservoir in said housing and adapted to have lubricating oil disposed therein, a porous member in said reservoir and impregnated with said oil, said porous member being spaced from said crank by an air gap, said oil resisting free flow from said porous member at ambient temperatures, whereby heat developed within said housing during operation of said transmission reduces the viscosity of said oil to a level where vibration of said housing during operation of said tool causes said oil to drip from said porous member onto said crank.

8. The improvement of claim 7 wherein said oil has a viscosity of about 2,000,000 Saybolt Seconds at 0° F, and about 80 Saybolt Seconds at 212° F.